Patented Apr. 18, 1933

1,903,927

UNITED STATES PATENT OFFICE

HELMUT LEGERLOTZ, OF BERLIN, GERMANY, ASSIGNOR TO FREDERICK STEARNS & COMPANY, OF DETROIT, MICHIGAN

MANUFACTURE OF SECONDARY AROMATIC AMINO-ALCOHOLS

No Drawing. Application filed March 24, 1930, Serial No. 438,642, and in Germany January 16, 1929.

This invention refers to the manufacture of aromatic amino-alcohols and in particular to the preparation of secondary amino-alcohols, constituting derivatives of the acetophenone, and in some parts it constitutes an improvement of the subject matter of my U. S. application, Serial 274,667 of May 2, 1928 now pending. In this application I have described bodies of the general type $$C_6H_4(OH).CO.CH_2.NHR,$$

and from these may be derived bodies of the type (A) 

In this formula the letter X is used to designate hydrogen, an alkyl, aryl or an acyl; Y indicates an acyl; R is a bivalent and R' a monovalent hydrocarbon radical, and from these bodies by reduction bodies of the type

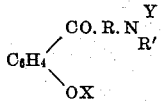

may be obtained. Some of these reduction products possessing the general formula referred to possess highly valuable therapeutic properties. In accordance with further investigations it has been ascertained that such amino-alcohols may also be obtained by reducing and then saponifying the reduction products obtained from the compounds of the type A. Inasmuch as with this treatment and in accordance with the state of the art there was a great liability of the splitting off of the amino-group, particularly in case it assumed the α-position with relation to the CO-group this result could not be anticipated.

As reducing agents I may use nickel-catalysts or catalysts of the noble metals or other known catalyzers, such as for instance amalgam of aluminium. The saponification is preferably effected by treatment with mineral acids.

Examples 1. 10 grams para-benzyl-oxy-ω-methyl-benzoyl-amino-aceto-phenone are dissolved in 200 cc. acetone, they are mixed with 5 grams palladium-catalyzer, and are then shaken with hydrogen. This will cause the substance to absorb hydrogen corresponding to 2 molecules of the body which causes the reduction of the ketone-group and the splitting off of the benzyl-group in the form of toluylen. After the termination of the hydratation the resulting product is sucked off from the catalyzer, and the filtrate is evaporated to dryness in vacuo. The residue is boiled on the reflux-condenser for several hours with aqueous alcoholic hydrochloric acid. Then the alcohol is removed in vacuo, the contents of the container are shaken up twice with ether and the clear, aqueous solution is rendered alkaline with ammonia. The para-hydroxy-phenyl-N-methyl-amino-ethanol-1-crystallizes out and is converted into the hydrochloride by treatment with alcoholic hydrochloric acid. Melting point 155–157° C.; yield 93% of the theory.

The reaction takes place according to the following equations:

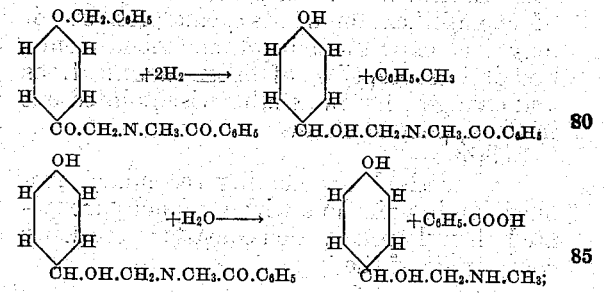

2. 15 grams meta-benzoyl-hydroxy-ω-methyl-toluolene-sulfonyl-amino-acetophenone are dissolved in 200 cc. acetone and after adding thereto 5 grams nickel-catalyzer, they are shaken with hydrogen. After having absorbed the amount of hydrogen required for the reduction of the ketone-group, the mass is sucked off from the catalyzer, and the filtrate is evaporated in vacuo. The remaining residue is heated for some time with concentrated hydro-iodic acid for the purpose of splitting off the benzoyl-group and the toluolene-sulfonyl-group; the reaction liquid is treated several times with ether, and the aqueous solution is then rendered ammoniacal. The meta-hydroxy-phenyl-N-methyl-amino-ethanol-1- which separates out is converted by treatment with alcoholic hydrochloric acid into the hydrochloride. Melting point 145° C.; yield 65% of the theoretical yield. The reaction takes place according to the following equations:

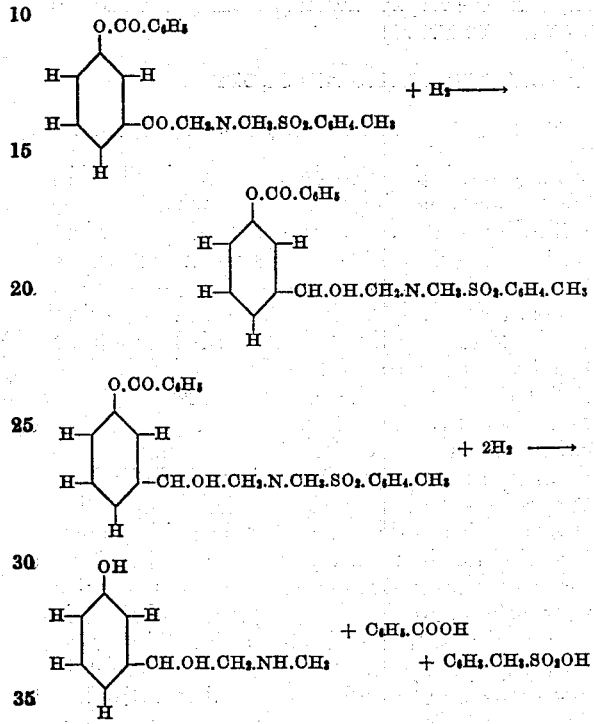

It should, of course, be understood that the invention is not restricted to the particular embodiments herein described merely by way of exemplification of its principles, but it may find expression in other embodiments, and it is susceptible of other modifications and changes, except as otherwise pointed out in the appended claims.

I claim:—

1. A method for making secondary aromatic amino alcohols with a monohydroxylated phenyl group which consists in reducing compounds of the type

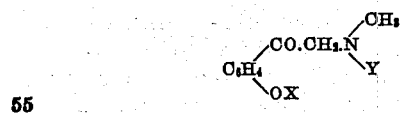

in which the two substituents of the phenyl group are in the para or meta position, X is a benzyl or benzoyl group and Y a benzoyl or toluolene sulfonyl group, saponifying the product obtained by the reduction, and separating the alcohol from the reaction mixture.

2. A method according to claim 1 in which the saponification is carried out with hydrochloric acid.

3. A method according to claim 1 in which the reduction is carried out by catalytic hydrogenation.

4. A method according to claim 1 in which the saponification is carried out at boiling temperature of the reaction mixture.

HELMUT LEGERLOTZ.